US008924448B2

(12) United States Patent
Isogai et al.

(10) Patent No.: US 8,924,448 B2
(45) Date of Patent: Dec. 30, 2014

(54) ARITHMETIC DEVICE, METHOD, AND PROGRAM PRODUCT

(75) Inventors: Taichi Isogai, Tokyo (JP); Kenichiro Furuta, Tokyo (JP); Hirofumi Muratani, Kanagawa (JP); Kenji Ohkuma, Kanagawa (JP); Tomoko Yonemura, Kanagawa (JP); Yoshikazu Hanatani, Tokyo (JP); Atsushi Shimbo, Tokyo (JP); Hanae Ikeda, Tokyo (JP); Yuichi Komano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 342 days.

(21) Appl. No.: 13/422,018

(22) Filed: Mar. 16, 2012

(65) Prior Publication Data

US 2012/0239721 A1 Sep. 20, 2012

Related U.S. Application Data

(63) Continuation of application No. PCT/JP2009/066439, filed on Sep. 18, 2009.

(51) Int. Cl.
G06F 7/58 (2006.01)
G06F 7/00 (2006.01)
H04L 9/28 (2006.01)
H04L 9/00 (2006.01)
G06F 7/72 (2006.01)
H04L 9/30 (2006.01)

(52) U.S. Cl.
CPC ............. *H04L 9/003* (2013.01); *G06F 7/725* (2013.01); *H04L 9/3013* (2013.01)
USPC .............................. 708/250; 708/492; 380/28

(58) Field of Classification Search
CPC .......... H04L 9/28; H04L 9/3066; H04L 9/308
USPC ..................................... 708/492, 250; 380/28
See application file for complete search history.

(56) References Cited

U.S. PATENT DOCUMENTS 5,799,088 A * 8/1998 Raike .............................. 380/30
6,876,745 B1 4/2005 Kurumatani
(Continued)

FOREIGN PATENT DOCUMENTS

JP 2000-187438 7/2000
JP 2002-540483 11/2002

OTHER PUBLICATIONS

International Search Report issued on Dec. 22, 2009 for PCT/JP2009/066439 filed on Sep. 18, 2009.

(Continued)

*Primary Examiner* — Chuong D Ngo
(74) *Attorney, Agent, or Firm* — Oblon, Spivak, McClelland, Maier & Neustadt, L.L.P.

(57) ABSTRACT

An arithmetic device includes an input unit inputting data that are elements of a group; a converting unit is configured, when the input data are in a second representation, to convert the input data into a first representation and to perform arithmetic operation on the converted first representation using an operand in the first representation in which at least one subcomponent is a zero element to convert the converted first representation into first converted data expressed in the first representation, and when the input data are in the first representation, to perform arithmetic operation on the input data using the operand in the first representation in which at least one subcomponent is a zero element to convert the input data into second converted data expressed in the first representation; and an operating unit that performs arithmetic processing on the first or the second converted data using secret information.

15 Claims, 5 Drawing Sheets

(56) References Cited

U.S. PATENT DOCUMENTS

| | | | |
|---|---|---|---|
| 7,162,033 B1 | 1/2007 | Coron | |
| 7,200,225 B1* | 4/2007 | Schroeppel | 380/28 |
| 2006/0274894 A1* | 12/2006 | Vasyltsov et al. | 380/28 |
| 2009/0180611 A1* | 7/2009 | Douguet et al. | 380/30 |

OTHER PUBLICATIONS

International Written Opinion issued on Dec. 22, 2009 for PCT/JP2009/066439 filed on Sep. 18, 2009.

Kenichiro Furuta et al.; "Projective Representation Randomization against DPA in Torus-Based Cryptosystems"; Proceedings of the IEICE Conference, A-7-6, Mar. 4, 2009.

Taichi Isogai et al.; "Selection of Representations Appropriate for Cryptosystems on Algebraic Tori"; The $31^{st}$ Symposium on Information Theory and its Applications, pp. 269-274, Oct. 7-10, 2008.

Taichi Isogai et al.; "Fast Exponentiation Methods for Cryptosystems on Algebraic Tori"; IEICE Technical Report, pp. 53-60, Dec. 10, 2008.

Karl Rubin et al.; "Torus-Based Cryptography"; Lecture Notes in Computer Science, vol. 2729, pp. 349-365, Dec. 22, 2003.

Steven Galbraith; "Disguising tori and elliptic curves"; Cyptology ePrint Archive [online], pp. 1-12, Jul. 20, 2006, <http://eprint.iacr.org/2006/248> 3 Tori.

Marten van Dijk et al.; "Asymptotically Optimal Communication for Torus-Based Cryptography"; Lecture Notes in Computer Science, pp. 157-178, Oct. 21, 2004.

Marten van Dijk et al.; "Practical Cryptography in High Dimensional Tori"; Lecture Notes in Computer Science, vol. 3494, pp. 234-250, May 27, 2005.

Jean-Sebastien Coron; "Resistance Against Differential Power Analysis for Elliptic Curve Cryptosystems"; Cryptographic Hardware and Embedded Systems, vol. 1717 of Lecture Notes in Computer Science, pp. 1-11, 1999.

* cited by examiner

ARITHMETIC DEVICE, METHOD, AND PROGRAM PRODUCT

CROSS-REFERENCE TO RELATED APPLICATIONS

This application is a continuation of PCT international application Ser. No. PCT/JP2009/066439 filed on Sep. 18, 2009, which designates the United States; the entire contents of which are incorporated herein by reference.

FIELD

Embodiments described herein relate generally to arithmetic processing using secret information, which is performed on elements of a subgroup of a multiplicative group.

BACKGROUND

In recent years, adversaries have been growing their abilities with the progress in computers, and the size of cryptosystems for making cryptanalysis difficult is increasing year after year. The increase in the size of security parameters of cryptosystems is an issue when public key cryptography is employed in small devices that do not have sufficient memory capacities and communication bands.

Accordingly, compressed encryption technologies for compressing the size of public keys and the size of encrypted data in public key cryptography have been proposed (see, for example, K. Rubin and A. Silverberg, "Torus-Based Cryptography", CRYPTO 2003, Springer LNCS 2729, pp. 349-365, 2003). The compressed encryption technologies are based on the fact that elements of a set can be represented by a small number of bits by using a subset called an algebraic torus among sets of elements used in public key cryptography. In addition, technologies using additional input for converting elements of a set into a representation with a small number of bits are known as technologies for increasing the compression ratio (see, for example, M. van Dijk and D. Woodruff, "Asymptotically Optimal Communication for Torus-Based Cryptography", CRYPTO 2004, Springer LNCS 3152, pp. 157-178, 2004).

In addition, in recent years, security against unauthorized attacks such as side channel attacks attempting code-breaking of secret information through power analysis or electromagnetic analysis or the like may be lowered in public key cryptosystems (see, for example, J. S. Coron, "Resistance Against Differential Power Analysis for Elliptic Curve Cryptosystems", CHES 1999, Springer LNCS 1717, pp. 292-302, 1999). In Furuta et al., "Projective Representation Randomization against DPA in Torus-Based Cryptosystems", Proceedings of the Institute of Electronics, Information and Communication Engineers General Conference A-7-6, 2009, measures are taken against side channel attacks through differential power analysis (DPA) by randomizing projective representations of ciphers using algebraic tori.

However, the computational cost of multiplication performed in the course of randomly selecting elements of an algebraic torus is large in the measures using algebraic tori against side channel attacks as in "Projective Representation Randomization against DPA in Torus-Based Cryptosystems" described above.

DETAILED DESCRIPTION

In general, according to one embodiment, an arithmetic device includes an input unit inputting data that are elements of a group. The elements of the group are expressed at least in a first representation and in a second representation, in which an element expressed by the first representation is constituted by a plurality of components each including a plurality of subcomponents, and one element of the group expressed in the second representation has a plurality of corresponding first representations. A converting unit is configured to: when the input data are in the second representation, convert the input data into a first representation, and perform arithmetic operation on the converted first representation using an operand in the first representation in which at least one subcomponent is a zero element to convert the converted first representation into first converted data expressed in the first representation, and when the input data are in the first representation, perform arithmetic operation on the input data using the operand in the first representation in which at least one subcomponent is a zero element to convert the input data into second converted data expressed in the first representation. The device further includes an operating unit that performs arithmetic processing on the first or the second converted data using secret information.

Embodiments of a device, a method and a program will be described below in detail with reference to the accompanying drawings. Description will be given below of an example in which an arithmetic device for performing arithmetic processing using secret information (arithmetic device based on secret information) is implemented as a decryption device for decrypting, by using secret information, encrypted data resulting from encryption according to an encryption and compression technology using algebraic tori.

Secret information refers to any non-public information present during arithmetic processing. In ElGamal encryption, for example, messages present during encryption processing, random numbers that are randomly generated, and the like are also included in secret information in addition to secret keys. Hash values and the like present during processing are also included in secret information depending on the encryption scheme. Public keys and the like, on the other hand, are not non-public information and thus not included in secret information.

Note that the applicable device is not limited to a decryption device, and any device performing arithmetic processing by using secret information on elements of a subgroup of a multiplicative group can be applied. For example, the technique of the embodiment can also be applied to a device for generating a signature by using secret key data.

In general, a field in which a set of elements is finite among fields that are sets of elements over which four arithmetic operations are defined is called a finite field. In addition, it is known that the number of elements included in a finite field is a prime number or a power of a prime number. Such fields are called a prime field and an extension field, respectively. An algebraic torus used in the compressed encryption technologies is a subgroup of a multiplicative group in an extension field.

There are three types of representations of an algebraic torus, which are an extension field representation, a projective representation and an affine representation. In the compressed encryption technologies of the related art using algebraic tori, an encryption device first associates a message with elements of an algebraic torus in the extension field representation. Next, the encryption device performs calculation on the extension field representation to calculate encrypted data, converts the encrypted data into the affine representation that is compressed, and transmits the compressed encrypted data to a decryption device. The decryption device converts the received encrypted and compressed data into the extension field representation, and performs calculation on the extension field representation to decrypt into plain data.

On the other hand, a decryption device according to the embodiment first converts the encrypted and compressed data represented in the affine representation to the projective representation instead of the extension field representation, and performs calculation thereon. In this process, a plurality of conversion maps for converting the affine representation into projective representations different from one another are prepared, and the affine representation is converted into the projective representation by using one conversion map randomly selected therefrom.

This increases the randomness of decryption processing and enhances the security. Specifically, since the waveform is not uniform, the risk that secret information is decoded is lowered even under side channel attacks or the like attempting to code-breaking the secret information through electromagnetic analysis or the like.

Figure 1:
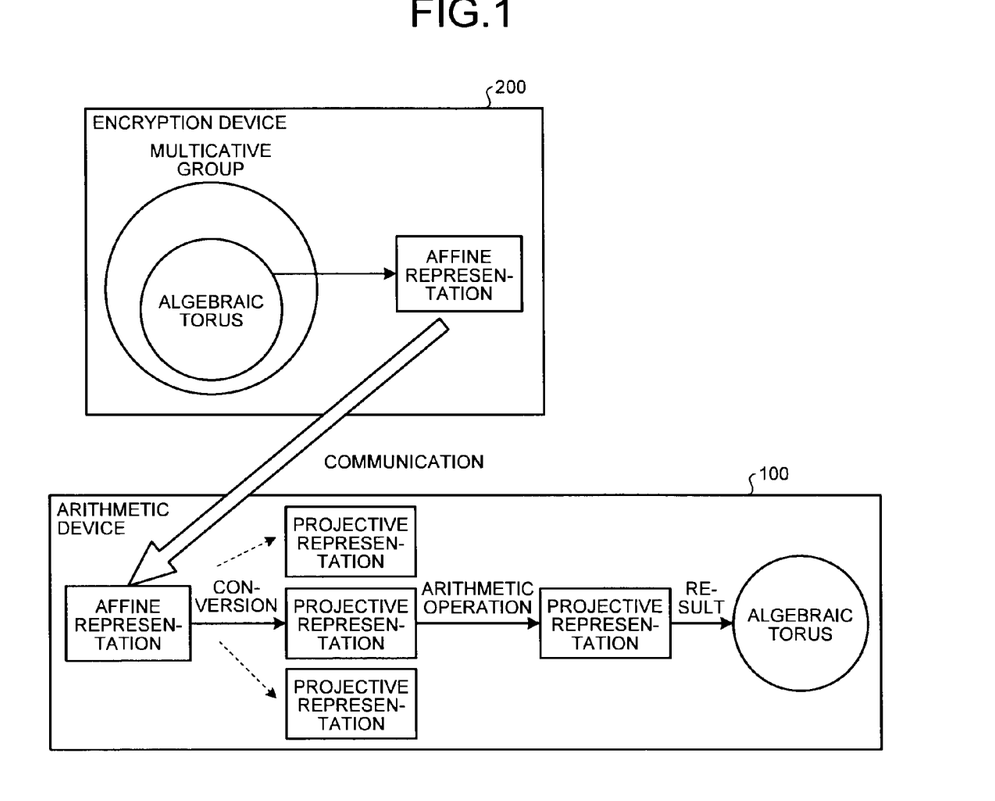
FIG. 1 is a diagram illustrating an outline of an encryption processing system according to an embodiment.

Here, an outline of an encryption processing system according to the embodiment will be described with reference to FIG. 1. FIG. 1 is a diagram illustrating the outline of the encryption processing system according to the embodiment. As illustrated in FIG. 1, the encryption processing system according to the embodiment includes an encryption device 200 and an arithmetic device 100 configured to perform arithmetic operations based on secret information.

The encryption device 200 generates encrypted data obtained by encrypting plain data according to the public key cryptosystems based on the discrete logarithm problem in algebraic torus having a group structure, compresses the generated encrypted data into the affine representation, and sends the affine representation to the arithmetic device 100.

Upon receiving the encrypted data expressed in the affine representation, the arithmetic device 100 converts the affine representation of the encrypted data into any of a plurality of corresponding projective representations that is selected according to a random number. The arithmetic device 100 then performs arithmetic operation by using the projective representation resulting from the conversion, and outputs plain data that are a element g of the algebraic torus as the operation result.

The decryption device of the related art converts the affine representation into one corresponding projective representation for arithmetic operation. In contrast, in the embodiment, the affine representation can be converted into the projective representation that is selectively determined from a plurality of projective representations to perform the arithmetic operation as illustrated in FIG. 1. As a result, it is possible to increase the randomness of the cryptosystems using the algebraic torus that is one of arithmetic processing using secret information.

Figure 2:
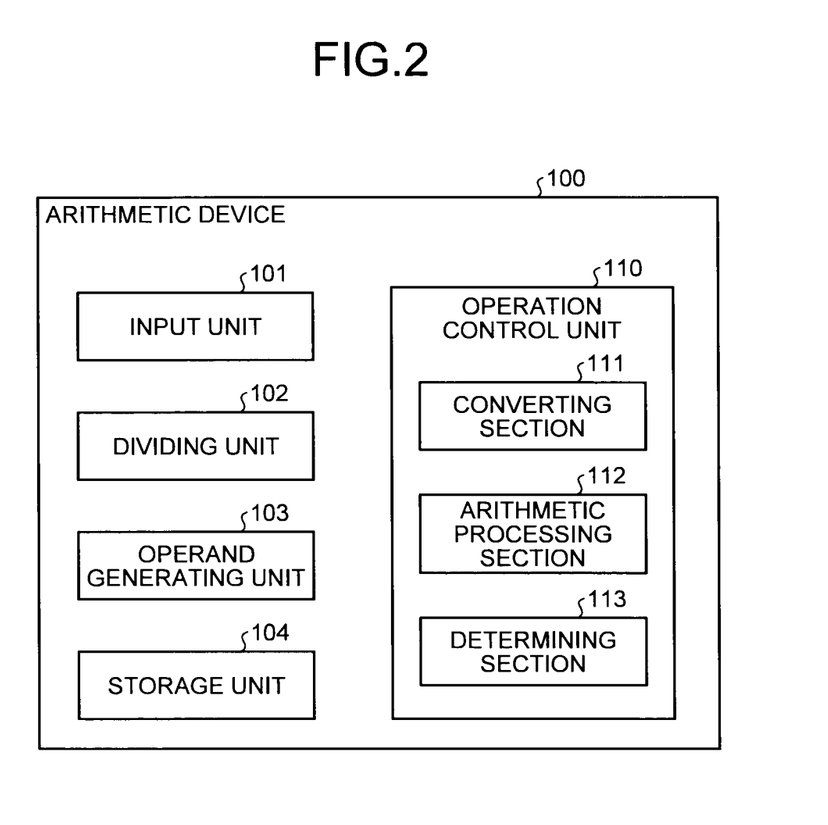
FIG. 2 is a block diagram of a decryption device according to the embodiment.

Next, a configuration of the arithmetic device 100 according to the embodiment will be described. FIG. 2 is a block diagram illustrating an exemplary configuration of the arithmetic device 100 according to the embodiment. The arithmetic device 100 is a device configured to restore encrypted data obtained by encryption according to the public key cryptosystems using an algebraic torus. As illustrated in FIG. 2, the arithmetic device 100 includes an input unit 101, a dividing unit 102, an operand generating unit 103, an operation control unit 110 and a storage unit 104.

The input unit 101 inputs input data such as encrypted and compressed data sent from the encryption device 200 and secret key data according to the public key cryptosystems to be used for decryption. The storage unit 104 stores the input encrypted and compressed data, secret key data and the like. The storage unit 104 may be formed by any commonly used storage medium such as a hard disk drive (HDD), an optical disc, a memory card, and a random access memory (RAM).

The dividing unit 102 divides the input encrypted and compressed data into a plurality of partial data pieces in units for decryption processing. For example, the dividing unit 102 divides the encrypted and compressed data into partial data pieces having a predetermined size. Note that the method for division is not limited thereto. Alternatively, the arithmetic device 100 may be configured not to divide the encrypted and compressed data therein. For example, the encryption device 200 may be configured to divide plain data into partial data pieces and send a plurality of encrypted and compressed data pieces resulting from encrypting and compressing the partial data pieces. In this case, the arithmetic device 100 may perform decryption processing in units of the plurality of encrypted and compressed data pieces.

The operand generating unit 103 generates a multiplier k that is an operand required for converting the representation by a converting section 111 (described later). The multiplier k may be provided in a table in advance or may be determined by generating a random number and based on the random number.

The operation control unit 110 controls arithmetic processing based on secret information. In the embodiment, the operation control unit 110 performs decryption processing of encrypted data. The operation control unit 110 includes the converting section 111, an arithmetic processing section 112 and a determining section 113.

The converting section 111 mutually converts the representations of various data used in decryption processing. For example, the converting section 111 mutually converts the data representation between a first representation and a second representation. An element of a group expressed in the second representation has a plurality of first representations. As a more specific example, the converting section 111 converts encrypted data compressed into the affine representation that is the second representation to the projective representation that is the first representation. In addition, the converting section 111 converts plain data resulting from decryption in the projective representation into the affine representation.

Note that the first and second representations are not limited to the projective representation and the affine representation, respectively. For example, other representations satisfying the aforementioned relation may be applied to the first and second representations.

Here, details of representations and a method for conversion between the representations used in the embodiment will be described. First, definitions of terms used in the embodiment will be explained.

(Definition 1)

A field having a finite number of elements is called a finite field and represented by $F_p$, where p is a prime number. An element of the finite field $F_p$ is represented by a non-negative integer satisfying the following expression (1).

$$a \in F_p (0 \leq a \leq p-1) \tag{1}$$

(Definition 2)

An element of a finite field (hereinafter written as $F_{p^m}$) expressed by the following expression (2) is expressed by a (m-1)-th order polynomial (m is a positive integer) having a coefficient in the finite field $F_p$ as expressed by the following expression (3). Hereinafter, z represents an indeterminate element of the polynomial.

$$F_{p^m} \tag{2}$$

$$a = \sum_{i=0}^{m-1} a_i z^i, \; a_i \in F_p \tag{3}$$

(Definition 3)

An element of a finite field (hereinafter written as $F_{(p^m)^3}$) expressed by the following expression (4) is expressed by a second-order polynomial having a coefficient in the finite field $F_{p^m}$ as expressed by the following expression (5). Hereinafter, y represents an indeterminate element of the polynomial.

$$F_{(p^m)^3} \tag{4}$$

$$\alpha = a_0 + a_1 y + a_2 y^2 \in F_{(p^m)^3}, a_i \in F_{p^m} \tag{5}$$

(Definition 4)

An algebraic torus is expressed by the following expression (6) (hereinafter written as $T_6(F_{p^m})$).

$$T_6(F_{p^m}) \tag{6}$$

(Definition 5)

An element of the algebraic torus $T_6(F_{p^m})$ is expressed by using $\alpha, \beta \in F_{(p^m)^3}$ as in the following expression (7). In the expression (7), $\alpha + \beta x$ represents an element of a finite field $F_{(p^m)^6}$, and is expressed by a first-order polynomial having a coefficient in the finite field $F_{(p^m)^3}$. "x" represents an indeterminate element of the polynomial. When $\alpha$ and $\beta$ satisfy the condition of the expression (7), the projective representation is simply expressed as in the following expression (8). Note that a variable c attached with a symbol "'" refers to data represented in the projective representation.

$$\left( T_6(F_{p^m}) = \left\{ \frac{\alpha - \beta x}{\alpha + \beta x} \;\middle|\; \alpha, \beta \in F_{(p^m)^3}, \right. \right. \tag{7}$$

$$\left. (\alpha, \beta) \neq (0_{F_{(p^m)^3}}, 0_{F_{(p^m)^3}}), \left( \frac{\alpha - \beta x}{\alpha + \beta x} \right)^{(p^m)^2 - p^m + 1} = 1_{T_6(F_{p^m})} \right\} \right)$$

$$c' = (\alpha, \beta), \alpha, \beta \in F_{(p^m)^3} \tag{8}$$

(Definition 6)

An element other than an identity element of an algebraic torus expressed by the following expression (9) is expressed using $c_0$ and $c_1$ satisfying the following expression (10). The following expression (11) represents a multiplicative group of the finite field $F_{p^m}$ constituted by members of the finite field other than zero elements. In addition, w in the expression (10) represents an element of the multiplicative group of the expression (11), and is a value determined in advance taking the calculation efficiency and the like into account. When $c_0$ and $c_1$ satisfy the expression (10), the affine representation is simply expressed as in the following expression (12). Note that a variable c attached with a symbol "*" refers to data represented in the affine representation.

$$T_6(F_{p^m}) \setminus \{1_{T_6(F_{p^m})}\} \tag{9}$$

$$T_6(F_{p^m}) \setminus \{1_{T_6(F_{p^m})}\} = \tag{10}$$

$$\left\{ \begin{array}{l} c_0 c_1 + c_1^2 y + (c_0^2 - 3^{-1}) w^{-1} y^2 - c_1 wx \\ c_0 c_1 + c_1^2 y + (c_0^2 - 3^{-1}) w^{-1} y^2 + c_1 wx \end{array} \;\middle|\; c_0 \in F_{p^m}, c_1 \in F_{p^m}^x \right\}$$

$$F_{p^m}^x \tag{11}$$

$$c^* = (c_0, c_1), c_0 \in F_{p^m}, C_1 \in F_{p^m}^x \tag{12}$$

Conversion processing between representations performed by the converting section 111 will be described based on the above-described definitions. First, a map (reference map) that is a reference for a plurality of maps for converting an affine representation into a projective representation by the converting section 111 will be described.

The reference map is a map to which an affine representation expressed by the following expression (13) is input and which outputs a projective representation expressed by the expression (14). More specifically, the reference map converts the affine representation into the projective representation by replacing the aforementioned expression (10) that is a fractional expression of the affine representation with the aforementioned expression (8) that is a fractional expression of the projective representation according to procedures expressed by the following expression (15). Note that the procedures 5 and 6 in the expression (15) mean that the values of $b_1$ and $b_2$ are set to zero elements of the finite field $F_{p^m}$.

$$(c_0, c_1) \in T_6(F_{p^m}): c_0 \in F_{p^m}, c_1 \in F_{p^m} \tag{13}$$

$$(\alpha, \beta) \in T_6(F_{p^m}): \alpha = (a_0, a_1, a_2), \tag{14}$$

$$\beta = (b_0, b_1, b_2) \in F_{(p^m)^3}, a_i, b_i \in F_{p^m}$$

$$\begin{cases} 1. & a_0 := c_0 c_1 \in F_{p^m}. \\ 2. & a_1 := c_1^2 \in F_{p^m}. \\ 3. & a_2 := (c_0^2 - 3^{-1}) w^{-1} \in F_{p^m}. \\ 4. & b_0 := c_1 \in F_{p^m}. \\ 5. & b_1 := 0_{F_{p^m}} \in F_{p^m}. \\ 6. & b_2 := 0_{F_{p^m}} \in F_{p^m}. \end{cases} \tag{15}$$

In the expression, w represents a constant part of a modulus polynomial determining the finite field $F_{(p^m)^3}$.

Next, a map with which the converting section 111 converts a projective representation into an affine representation will be described. The converting section 111 receives the projective representation expressed by the following expression (16) as an input and outputs the affine representation expressed by an expression (17) to convert the projective representation into the affine representation. More specifically, the converting section 111 converts the projective representation into the affine representation according to procedures expressed by the following expression (18). Note that the procedure 1 in the expression (18) means that the values of $c_0$ and $c_1$ are set to zero elements of $F_{p^m}$ when $\beta$ is a zero element of the finite field $F_{(p^m)^3}$.

$$(\alpha, \beta) \in T_6(F_{p^n}): \alpha = (a_0, a_1, a_2), \quad (16)$$
$$\beta = (b_0, b_1, b_2) \in F_{(p^m)^3}, a_i, b_i \in F_{p^m}$$

$$(c_0, c_1) \in T_6(F_{p^n}): c_0 \in F_{p^m}, c_1 \in F_{p^m} \quad (17)$$

$$\begin{cases} 1. \text{ if } \beta = 0_{F_{(p^m)^3}} \text{ then} & (18) \\ \quad 1.1 \quad c_0 := 0_{F_{p^m}} \in F_{p^m}. \\ \quad 1.2 \quad c_1 := 0_{F_{p^m}} \in F_{p^m}. \\ 2. \text{ else} \\ \quad 2.1 \text{ calculate } \gamma := \alpha \cdot \beta^{-1} \in F_{(p^m)^3} \\ \quad 2.2 \text{ obtain } (c_0, c_1) \text{ from } \gamma := c_0 + c_1 y + c_2 y^2 \in F_{(p^m)^3} \end{cases}$$

In the embodiment, a conversion map that outputs a projective representation obtained by multiplying the projective representation output from the reference map described with reference to the expressions (13) to (15) by the multiplier k that is an element of $F_{(p^m)^3}$ is defined and used. Specifically, the operand generating unit 103 determines a multiplier k that is an element of the finite field $F_{(p^m)^3}^\times$ ("×" means elements not including zero elements), and outputs a projective representation $(k\alpha, k\beta)$ obtained by multiplying the projective representation $(\alpha, \beta)$ output from the reference map by k.

Note that $\alpha$, $\beta$ and the multiplier k are elements of the finite field $F_{(p^m)^3}$ as already described. Accordingly, the multiplication of the finite field $F_{(p^m)^3}$ needs to be performed twice so as to calculate $(k\alpha, k\beta)$, which results in a high computational cost.

The calculation of $(k\alpha, k\beta)$ will be more specifically described here. First, the finite field $F_p$, the finite field $F_{(p^m)}$ and the finite field $F_{(p^m)^3}$ are defined as in the following expressions (19-1) to (19-3).

$$a_{ij} \beta F_p \quad (19\text{-}1)$$

$$a_i \in F_{p^m} \quad (19\text{-}2)$$

$$\alpha \in F_{(p^m)^3} \quad (19\text{-}3)$$

An element $a_i$ of the finite field $F_{(p^m)}$ can be expressed by a polynomial having m elements of the finite field $F_p$ as components as in the following expression (20).

$$a_i = \underbrace{a_{i0} z^0 + a_{i1} z + a_{i2} z^2 + \ldots + a_{i(m-1)} z^{m-1}}_{m \text{ elements}} \quad (20)$$

Furthermore, the element $\alpha$ of the finite field $F_{(p^m)^3}$ has the element $a_i$ of the finite field $F_{(p^m)}$ as a component. Thus, the element $\alpha$ of the finite field $F_{(p^m)^3}$ can be expressed by a polynomial using 3 m elements of the finite field $F_p$ as in the following expression (21).

$$\alpha = a_0 y^0 + a_1 y^1 + a_2 y^2 \quad (21)$$
$$= \underbrace{a_{00} + a_{01} z + a_{02} z^2 + \ldots + a_{0(m-1)} z^{m-1} +}_{3m \text{ elements}}$$
$$(a_{10} + a_{11} z + a_{12} z^2 + \ldots + a_{1(m-1)} z^{m-1}) y +$$
$$(a_{20} + a_{21} z + a_{22} z^2 + \ldots + a_{2(m-1)} z^{m-1}) y^2$$

Therefore, the multiplication of the finite field $F_{(p^m)^3}$ is as in the following expression (22), and it can be seen that the multiplication corresponding to 9 $m^2$ times of that for the finite field $F_p$ needs to be performed. According to this artless method, multiplication corresponding to twice this multiplication, that is, multiplication corresponding to 18 $m^2$ times of that for the finite field $F_p$ needs to be performed for the calculation of $(k\alpha, k\beta)$.

$$\{a_{00} + a_{01} z + a_{02} z^2 + \ldots + a_{0(m-1)} z^{m-1} + \quad (22)$$
$$(a_{10} + a_{11} z + a_{12} z^2 + \ldots + a_{1(m-1)} z^{m-1}) y +$$
$$(a_{20} + a_{21} z + a_{22} z^2 + \ldots + a_{2(m-1)} z^{m-1}) y^2 \} \times$$
$$\{b_{00} + b_{01} z + b_{02} z^2 + \ldots + b_{0(m-1)} z^{m-1} +$$
$$(b_{10} + b_{11} z + b_{12} z^2 + \ldots + b_{1(m-1)} z^{m-1}) y +$$
$$(b_{20} + b_{21} z + b_{22} z^2 + \ldots + b_{2(m-1)} z^{m-1}) y^2 \}$$

Here, when an element in a certain finite field A is expressed by a polynomial having an element of another finite field B in each term, the terms are referred to as components of the finite field A. In addition, when each term of the finite field B is further expressed by a polynomial or a monomial in which terms include components of still another finite field C and are components of the finite field B, these terms are referred to as subcomponents of the finite field A.

In the example described above, the element $\alpha$ of the finite field $F_{(p^m)^3}$ has the element $a_i$ of the finite field $F_{(p^m)}$ as a component, and the element $a_i$ of the finite field $F_{(p^m)}$ has m elements of the finite field $F_p$ as components. Therefore, the components of the finite field $F_{(p^m)}$ are subcomponents of the finite field $F_{(p^m)^3}$.

On the other hand, if side channel attacks identify only one bit, it is also effective as a measure against the side channel attacks to obtain $(k\alpha, k\beta)$ by selecting a subcomponent from members of the finite field $F_{p^m}^\times$ or the finite field $F_p^\times$, and using the multiplier k in which the remaining subcomponents are set to zero elements. In order to reduce the computational cost for the measure against the side channel attacks, subcomponents constituting the finite field $F_{(p^m)^3}$ include zero elements and arithmetic operations relating to the zero elements are not performed in the embodiment.

Then, the converting section 111 performs multiplication by using the multiplier k generated by the operand generating unit 103 and including zero elements in the subcomponents to converts the affine representation into the projective representation.

Note that any projective representation obtained by multiplication by the multiplier k corresponds to one affine representation. This is because the multiplier k is balanced out as a result of dividing $\alpha$ by $\beta$ for obtaining a value $\gamma$ in the procedure 2.1 in the expression (18). Accordingly, all the results of arithmetic operations using the projective representation obtained by multiplication by any multiplier k are the same in the affine representation.

The arithmetic processing section 112 performs arithmetic processing on encrypted data converted into the projective representation by the converting section 111 by using secret information. More specifically, the arithmetic processing section 112 performs decryption processing based on the discrete logarithm problem in a finite field on encrypted data by using secret key data to calculate plain data. Still more specifically, the arithmetic processing section 112 performs decryption processing on encrypted data by using a plurality of times of exponentiation or multiplication, or a hash function H using the encrypted data as an input value according to the Cramer-Shoup encryption scheme to output plain data. Note that the arithmetic processing section 112 may be configured to employ other encryption schemes such as the ElGamal encryption.

Figure 3:
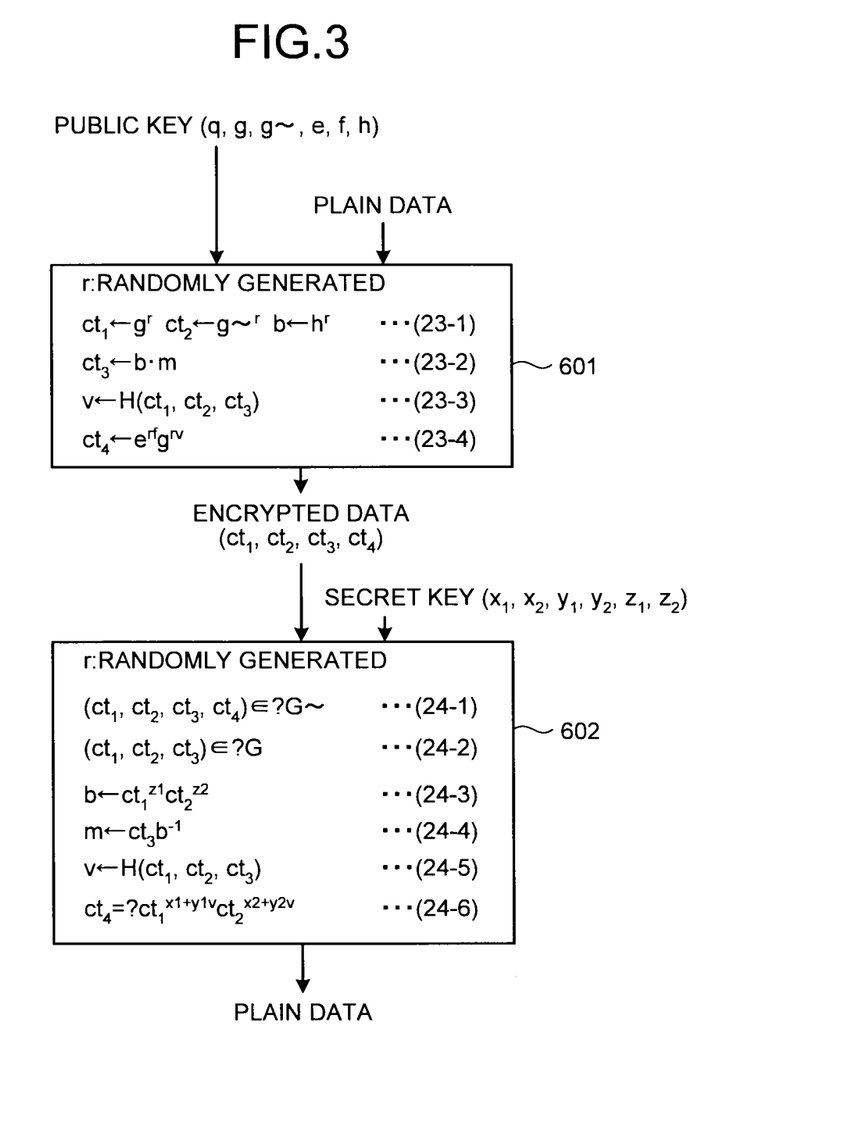
FIG. 3 is an explanatory diagram illustrating procedures for the Cramer-Shoup encryption scheme.

The Cramer-Shoup encryption scheme will be described here. FIG. 3 is an explanatory diagram illustrating procedures for encryption and decryption according to the Cramer-Shoup encryption scheme. In FIG. 3, q represents a prime number, g represents a generator of a group G (the order thereof is q) in which a cipher is defined, and g~, e, f and h are members of the group G. The plain data m is also a member of G. r represents a random number that is randomly generated.

In encryption processing 601, encrypted data ($ct_1$, $ct_2$, $ct_3$, $ct_4$) corresponding to the plain data m are calculated by expressions (23-1) to (23-4) described below and in FIG. 3. Here, H( ) in the expression (23-3) represents a hash function, and the encrypted data are input to the hash function H( ) to obtain a hash value v. The secret key is an integer from 0 to q−1.

r: randomly generated $$ct_1 \leftarrow g^r, ct_2 \leftarrow g\text{\textasciitilde}^r, b \leftarrow h^r \quad (23\text{-}1)$$

$$ct_3 \leftarrow b \cdot m \quad (23\text{-}2)$$

$$v \leftarrow H(ct_1, ct_2, ct_3) \quad (23\text{-}3)$$

$$ct_4 \leftarrow e^r f g^{rv} \quad (23\text{-}4)$$

In decryption processing 602, it is checked whether or not plain data are valid based on a secret key ($x_1$, $x_2$, $y_1$, $y_2$, $z_1$, $z_2$) and the encrypted data ($ct_1$, $ct_2$, $ct_3$, $ct_4$) by expressions (24-1) to (24-6) described below and in FIG. 3, and the plain data m are calculated. Here, the secret key ($x_1$, $x_2$, $y_1$, $y_2$, $z_1$, $z_2$) is an integer from 0 to q−1. In addition, ct∈?G (or G~) means to determine whether or not ct belongs to the group G (or the group G~).

r: randomly generated $$(ct_1, ct_2, ct_3, ct_4) \in ? G\text{\textasciitilde} \quad (24\text{-}1)$$

$$(ct_1, ct_2, ct_3) \in ? G \quad (24\text{-}2)$$

$$b \leftarrow ct_1^{z_1} ct_2^{z_2} \quad (24\text{-}3)$$

$$m \leftarrow ct_3 b^{-1} \quad (24\text{-}4)$$

$$v \leftarrow H(ct_1, ct_2, ct_3) \quad (24\text{-}5)$$

$$ct_4 = ? ct_1^{x_1+y_1 v} ct_2^{x_2+y_2 v} \quad (24\text{-}6)$$

As described above, note that secret information that can be a target of code-breaking by side channel attacks or the like includes b (expression (24-3)) appearing during the calculation, a random number r, a hash value v, and the like in addition to the secret key ($x_1$, $x_2$, $y_1$, $y_2$, $z_1$, $z_2$).

Referring back to FIG. 2, the determining section 113 determines the validity of the encrypted data. For example, the determining section 113 determines whether or not the elements of the encrypted data are members of a correct group. In addition, the determining section 113 calculates a hash value of the input encrypted data, compares a value calculated using the calculated hash value and a predetermined component of the input encrypted data, and determines the validity of the encrypted data depending on whether the value and the component are coincident.

Figure 4:
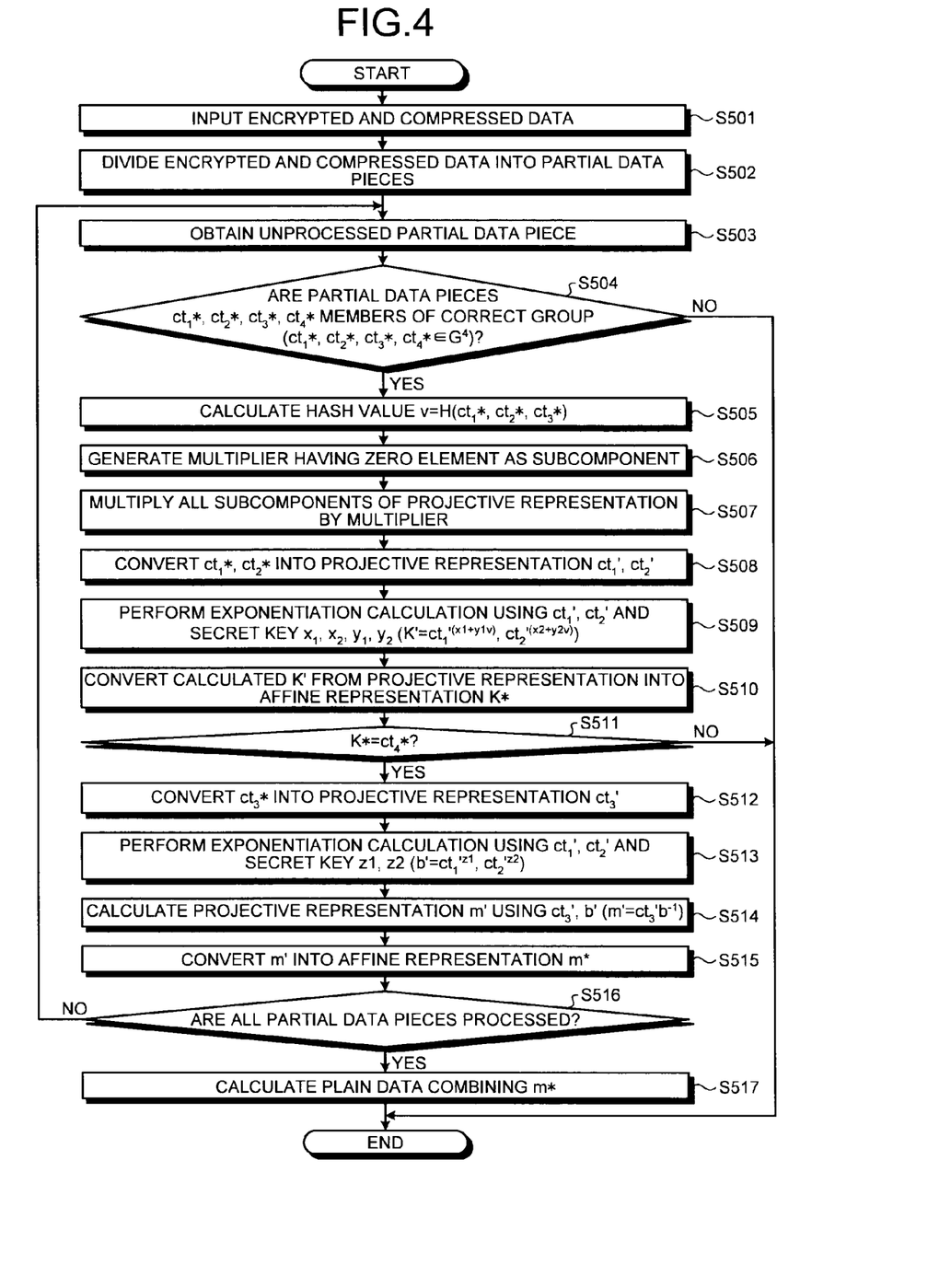
FIG. 4 is a flowchart illustrating an overall flow of decryption processing according to the embodiment.

Next, decryption processing by the arithmetic device 100 according to the embodiment configured as described above will be described with reference to FIG. 4. FIG. 4 is a flowchart illustrating an overall flow of the decryption processing according to the embodiment.

First, the input unit 101 inputs encrypted data that are encrypted according to the Cramer-Shoup encryption scheme described above and compressed into an affine representation (encrypted and compressed data) (step S501). For example, the input unit 101 inputs, from the storage unit 104, encrypted and compressed data received from the encryption device 200 and stored in the storage unit 104.

In the next step S502, the dividing unit 102 divides the input encrypted and compressed data into a plurality of partial data pieces. In the following, the partial data pieces are represented by four components ($ct_1^*$, $ct_2^*$, $ct_3^*$, $ct_4^*$). In the following, note that a variable attached with a symbol "*" refers to data represented in the affine representation similarly to the expression (8) and the expression (12) described above. In addition, a variable attached with a symbol "˜" refers to data represented in the projective representation.

In the next step S503, the operation control unit 110 obtains an unprocessed partial data piece. In the next step S504, the determining section 113 determines whether or not each of $ct_1^*$, $ct_2^*$, $ct_3^*$ and $ct_4^*$ that are components (elements) of the obtained partial data pieces is a member of a correct group. Specifically, in step S504, the determining section 113 determines whether or not ($ct_1^*$, $ct_2^*$, $ct_3^*$, $ct_4^*$) $\in G_4$ is satisfied.

If it is determined in step S504 that a component of the partial data pieces is not an element of a correct group (No in step S504), the decryption processing ends. On the other hand, if it is determined that the components of the partial data pieces are members of a correct group (Yes in step S504), the processing proceeds to step S505. In step S505, the operation control unit 110 calculates a hash value v=H($ct_1^*$, $ct_2^*$, $ct_3^*$) by using $ct_1^*$, $ct_2^*$, $ct_3^*$ as input to a hash function H.

In the next step S506, the operand generating unit 103 selects one or more subcomponents from the finite field $F_{(p^m)}^3$ or the finite field $F_p^x$, and determines a multiplier k in which the remaining subcomponents are zero elements. In the next step S507, the converting section 111 performs conversion of the representation by using the determined multiplier k. In this process, if the input data are in the affine representation, the affine representation is converted into the projective representation. On the other hand, if the input data are in the projective representation, the conversion of the representation is not performed. More specifically, the converting section 111 multiplies all the subcomponents of the projective representation by the multiplier k.

In the multiplication by the multiplier k in step S507, the arithmetic operations relating to the zero elements of the multiplier k are not performed. For example, in step S506, the finite field $F_{(p^m)}$ is selected as subcomponents of the multiplier k, one of the subcomponents is generated by the operand generating unit 103, and the remaining subcomponents are set to zero elements. In this case, the cost for calculating (kα, kβ) in step S507 corresponds to six times of the multiplication for the finite field $F_{(p^m)}$. This is about ⅓ as compared to the calculation cost in the case where calculation corresponding to twice of the multiplication of the finite field $F_{(p^m)^3}$ is performed in an artless manner.

Alternatively, for example, the finite field $F_p$ is selected as the multiplier k, one of the subcomponents is generated by the operand generating unit 103, and the remaining subcomponents are set to zero elements in step S506. In this case, the cost for calculating (kα, kβ) in step S507 corresponds to 6 m times of the multiplication for the finite field $F_p$. This is about 1/(3 m) as compared to the calculation cost in the case where calculation corresponding to twice of the multiplication of the finite field $F_{(p^m)^3}$ is performed in an artless manner.

As described above, the subcomponents of the operand (in this case, the multiplier) may be members of either of the finite field $F_{(p\char`\^m)}$ and the finite field $F_p$, and only need to constitute the same structure as the first representation (in this case, the projective representation) by including the plurality of subcomponents.

The example of the calculation of (kα, kβ) in step S507 will be described in more detail using the expression (22) described above as an example. In the expression (22), an element (before the multiplication sign "x") having a coefficient $a_{ij}$ is represented by α or β and an element (after the multiplication sign "x") having a coefficient $b_{ij}$ is the multiplier k. The operand generating unit 103 sets z in the multiplier k to 0, for example, to generate only a coefficient $a_{00}$ as a subcomponent and sets the remaining subcomponents to zero elements. The multiplication is not performed for the subcomponents that are zero elements. As a result, the calculation of (kα, kβ) includes only 6 m times of the multiplication of the finite field $F_p$ and the calculation cost is about 1/(3 m) as compared to that in the case where calculation corresponding to twice of the multiplication of the finite field $F_{(p\char`\^m)\char`\^3}$ is performed in an artless manner.

In addition, in generating the multiplier k by using a random number, the multiplier k and the random number can be associated as follows. When the multiplier k is constituted by an element of the finite field $F_{p\char`\^m}^x$ and two zero elements as described above, the finite field $F_{p\char`\^m}^x$ can be expressed by a vector having m elements. Therefore, the operand generating unit 103 is configured to generate a random number having any value from 1 to ($p^m-1$). Then, values of the respective digits when the generated random number is expressed by a p-adic number of m digits are associated with subcomponents of the multiplier k that are elements of the vector. As a result, it is possible to associate the generated random number with ($p^m-1$) different multipliers k.

Furthermore, when the multiplier k is constituted by elements of $F_p^x$ and $p^{(3m-1)}$ zero elements, the operand generating unit 103 is configured to generate a random number that is any value from 1 to (p-1). Then, values of respective digits of the generated random number in p-adic number of m digits are associated with subcomponents of the multiplier k that are the elements of the vector. As a result, the generated random number can be associated with (p-1) different multipliers k.

Note that the method for associating the random number and the multipliers k is not limited thereto, and any method capable of selecting any of a plurality of multipliers k depending on the random number can be applied.

Still further, in step S506, the operand generating unit 103 is not limited to generating the multipliers k by using a random number, and may alternatively hold a multiplier table in which a plurality of multipliers k are registered in advance and sequentially use the multipliers k registered in the multiplier table.

In the next step S508, the converting section 111 converts $ct_1^*$, $ct_2^*$ expressed in the affine representation into $ct_1'$, $ct_2'$ in the projective representation by using the selected multiplier k, and outputs the converted data. In addition, the arithmetic processing section 112 performs exponentiation calculation $K'=ct_1'^{(x1+y1v)} ct_2'^{(x2+y2v)}$ by using a hash value v, $ct_1'$ and $ct_2'$ in the projective representation, and $x_1$, $x_2$, $y_1$, $y_2$ out of the secret key data (step S509). Then, the converting section 111 converts the variable K' expressed in the projective representation into a variable K* in the affine representation (step S510).

In the next step S511, the determining section 113 determines whether or not the variable K* and $ct_4^*$ out of the components of the input encrypted data are coincident. Note that it only needs to confirm that the variable K* and $ct_4^*$ are equivalent in step S511. It may therefore be configured to convert the variable K' in the projective representation into a variable K in the extension field representation instead of the variable K* in the affine representation, and confirm that the variable K and $ct_4^*$ are coincident.

If it is determined in step S511 that the variable K* and $ct_4^*$ are not coincident (No in step S511), the decryption processing ends. On the other hand, if it is determined that the variable K* and $ct_4^*$ are coincident (Yes in step S511), the converting section 111 converts $ct_3^*$ expressed in the affine representation into $ct_3'$ in the projective representation (step S512). In the next step S513, the arithmetic processing section 112 performs exponentiation calculation $b'=ct_1'^{z1} ct_2'^{z2}$ by using $ct_1'$ and $ct_2'$ and $z_1$ and $z_2$ out of the secret key data.

In the next step S514, the arithmetic processing section 112 calculates decrypted data $m'=ct_3' b'^{-1}$ corresponding to partial data pieces expressed in the projective representation by using $ct_3'$ obtained by the conversion and the calculated b'. Next, the converting section 111 converts the decrypted data m' into plain data m* expressed in the affine representation (step S515).

In the next step S516, the operation control unit 110 determines whether or not all the partial data pieces are processed. If it is determined that all the partial data pieces are not processed (No in step S516), the processing returns to step S503 where a next unprocessed partial data piece is obtained, and the subsequent processes are repeated.

On the other hand, if it is determined in step S516 that all the partial data pieces are processed (Yes in step S516), the processing proceeds to step S517. In step S517, the arithmetic processing section 112 calculates plain data resulting from combining the decrypted data m' corresponding to the partial data pieces, and ends the decryption processing.

As described above, the decryption device according to the embodiment converts the affine representation into the projective representation while reducing the cost for the conversion by providing the multiplier k to be used for converting the affine representation into the projective representation so that one or more subcomponents thereof are zero elements and not performing calculation for the part of calculation where the subcomponents are zero elements. In addition, the decryption device performs arithmetic operations for the decryption processing by using the projective representation resulting from the conversion. As a result, it is possible to increase the randomness of the arithmetic processing using secret information while reducing the amount of calculation and enhance the security.

Note that there are concepts other than algebraic tori that are substantially the same as those of the affine representation and the projective representation in algebraic tori. For example, in the case of elliptic curves, such concepts are present in the forms of affine coordinates and projective coordinates. Thus, the present invention is not limited to the concepts of algebraic torus but may be applied to elliptic curve cryptosystems and the like.

Figure 5:
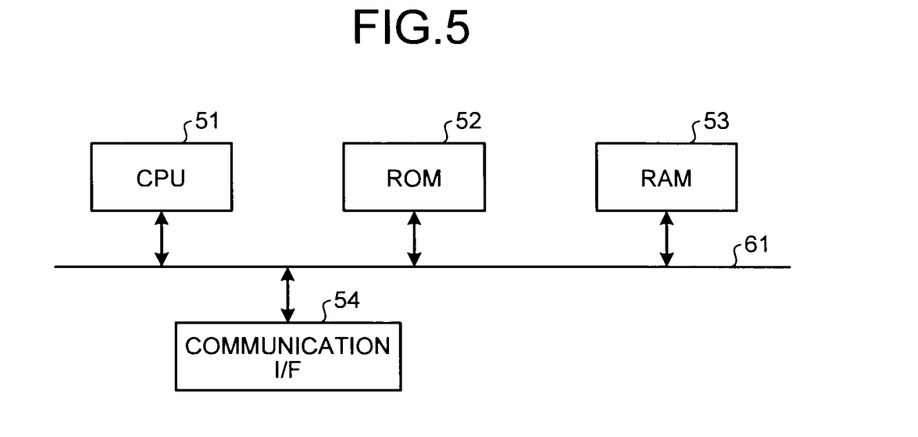
FIG. 5 is a diagram illustrating a hardware configuration of the decryption device according to the embodiment.

Next, a hardware configuration of the decryption device according to the embodiment will be described with reference to FIG. 5. FIG. 5 is an explanatory diagram illustrating a hardware configuration of the decryption device according to the embodiment.

The decryption device according to the embodiment include a control unit such as a central processing unit (CPU) 51, a storage unit such as a read only memory (ROM) 52 and a RAM 53, a communication interface 54 connected to a network for communication, and a bus 61 connecting the respective components.

Decryption programs to be executed by the decryption device according to the embodiment are embedded in the ROM 52 in advance and provided therefrom. Alternatively, the decryption programs to be executed by the decryption device according to the embodiment may be recorded on a computer-readable recording medium such as a compact disk read only memory (CD-ROM), a flexible disk (FD), a compact disk recordable (CD-R), a digital versatile disk (DVD) and the like in the form of a file that can be installed or executed, and provided therefrom.

Still alternatively, the decryption programs to be executed by the decryption device according to the embodiment may be stored on a computer system connected to a network such as the Internet, and provided by being downloaded via the network. In addition, the decryption programs to be executed by the decryption device according to the embodiment be provided or distributed via a network such as the Internet.

The decryption programs to be executed by the decryption device according to the embodiment has a modular configuration including the units (the input unit 101, the dividing unit 102, the operand generating unit 103, and the operation control unit 110) described above, and in an actual hardware configuration, the CPU 51 reads the decrypting programs from the ROM 52 and executes the programs and, as a result, the respective units are loaded on a main storage unit and generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cryptographic device that performs a processing on elements of a group by using secret information, wherein
the elements of the group are expressed at least in a first representation and in a second representation, in which an element expressed by the first representation is constituted by a plurality of components each including a plurality of subcomponents, and one element of the group expressed in the second representation has a plurality of corresponding first representations, and
an element expressed in the first representation obtained by performing an arithmetic operation on an element expressed in the first representation by using an operand having a same group structure as a component included in the first representation that represents a same element of the group as that before the arithmetic operation,
the cryptographic device comprising:
an interface configured to input input data that are elements of the group; and
a processor configured to:
convert the input data into the first representation when the input data are in the second representation, and perform the arithmetic operation on the converted first representation by using the operand in the first representation in which at least one subcomponent is a zero element to convert the converted first representation into first converted data expressed in the first representation;
perform the arithmetic operation on the input data by using the operand in the first representation in which at least one subcomponent is a zero element to convert the input data into second converted data expressed in the first representation when the input data are in the first representation; and
perform the processing on the first converted data or the second converted data by using the secret information to produce output data,
thereby to increase randomness to enhance security for the output data.

2. The cryptographic device according to claim 1, wherein the processor is configured to:
set in advance a position of the subcomponent that is the zero element included in the used operand, and
omit the arithmetic operation for the zero element included in the operand.

3. The cryptographic device according to claim 2, wherein the processor is further configured to:
generate the operand in which at least one subcomponent is a zero element, and
convert the input data into the first representation by using the generated operand.

4. The cryptographic device according to claim 3, wherein the input data arc encrypted data obtained by encryption according to an encryption scheme based on a discrete logarithm problem of the group and expressed in the second representation, and
the processor is configured to:
convert the encrypted data into the first representation by using an operand generated to select at least one of the subcomponents of the operand, and
produce the output data by performing a predetermined decryption according to the encryption scheme on the encrypted data converted into the first representation by using the secret information.

5. The cryptographic device according to claim 4, wherein the encryption scheme is based on the discrete logarithm problem of the group that is an algebraic torus, and
the first representation is a projective representation and the second representation is an affine representation.

6. A cryptographic method for performing a processing on elements of a group by using secret information, wherein
the elements of the group are expressed at least in a first representation and in a second representation, in which an element expressed by the first representation is constituted by a plurality of components each including a plurality of subcomponents, and one element of the group expressed in the second representation has a plurality of corresponding first representations, and
an element expressed in the first representation obtained by performing an arithmetic operation on an element expressed in the first representation by using an operand having a same group structure as a component included in the first representation that represents a same element of the group as that before the arithmetic operation,
the cryptographic method comprising:
inputting, by an interface, input data that are elements of the group;
converting, by a processor, the input data into the first representation when the input data are in the second representation, and performing, by the processor, the arithmetic operation on the converted first representation by using the operand in the first representation in which at least one subcomponent is a zero element to convert the converted first representation into first converted data expressed in the first representation;
performing, by the processor, the arithmetic operation on the input data by using the operand in the first representation in which at least one subcomponent is a zero element to convert the input data into second converted data expressed in the first representation when the input data are in the first representation; and performing, by the processor, the processing on the first converted data or the second converted data by using the secret information to produce output data, thereby to increase randomness to enhance security for the output data.

7. The cryptographic method according to claim 6, wherein
a position of the subcomponent that is the zero element included in the operand used by the converting is set in advance, and the converting omits the arithmetic operation for the zero element included in the operand.

8. The cryptographic method according to claim 7, further comprising operand generating to generate the operand in which at least one subcomponent is a zero element, wherein
the converting converts the input data into the first representation by using the operand generated by the operand generating.

9. The cryptographic method according to claim 8, wherein
the input data are encrypted data obtained by encryption according to an encryption scheme based on a discrete logarithm problem of the group and expressed in the second representation, the converting converts the encrypted data into the first representation by using an operand generated to select at least one of the subcomponents of the operand, and the performing produces the output data by performing a predetermined decryption according to the encryption scheme on the encrypted data converted into the first representation by using the secret information.

10. The cryptographic method according to claim 9, wherein
the encryption scheme is based on the discrete logarithm problem of the group that is an algebraic torus, and the first representation is a projective representation and the second representation is an affine representation.

11. A non-transitory computer readable medium having a computer program recorded thereon, the computer program configured to perform a method when executed on a computer for performing a processing on elements of a group by using secret information, wherein
the elements of the group are expressed at least in a first representation and in a second representation, in which an element expressed by the first representation is constituted by a plurality of components each including a plurality of subcomponents, and one element of the group expressed in the second representation has a plurality of corresponding first representations, and an element expressed in the first representation obtained by performing an arithmetic operation on an element expressed in the first representation by using an operand having a same group structure as a component included in the first representation that represents a same element of the group as that before the arithmetic operation, the method comprising:
inputting input data that are elements of the group;
converting the input data into the first representation when the input data are in the second representation, and performing the arithmetic operation on the converted first representation by using the operand in the first representation in which at least one subcomponent is a zero element to convert the converted first representation into first converted data expressed in the first representation;

performing the arithmetic operation on the input data by using the operand in the first representation in which at least one subcomponent is a zero element to convert the input data into second converted data expressed in the first representation when the input data are in the first representation; and performing the processing on the first converted data or the second converted data by using the secret information to produce output data, thereby to increase randomness to enhance security for the output data.

12. The method according to claim 11, wherein
a position of the subcomponent that is the zero element included in the operand used by the converting is set in advance, and the converting omits the arithmetic operation for the zero element included in the operand.

13. The method according to claim 12, further comprising:
operand generating to generate the operand in which at least one subcomponent is a zero element, wherein the converting converts the input data into the first representation by using the operand generated by the operand generating.

14. The method according to claim 13, wherein
the input data are encrypted data obtained by encryption according to an encryption scheme based on a discrete logarithm problem of the group and expressed in the second representation, the converting converts the encrypted data into the first representation by using an operand generated to select at least one of the subcomponents of the operand, and the performing produces the output data by performing a predetermined decryption according to the encryption scheme on the encrypted data converted into the first representation by using the secret information.

15. The method according to claim 14, wherein
the encryption scheme is based on the discrete logarithm problem of the group that is an algebraic torus, and the first representation is a projective representation and the second representation is an affine representation.

* * * * *